(12) United States Patent
Childress et al.

(10) Patent No.: US 8,364,804 B2
(45) Date of Patent: *Jan. 29, 2013

(54) USING PRESENCE IN A SYSTEM MANAGEMENT ENVIRONMENT

(75) Inventors: Rhonda L. Childress, Austin, TX (US);
Ward K. Harold, Austin, TX (US);
David Bruce Kumhyr, Austin, TX (US);
Neil R. Pennell, Cedar Creek, TX (US);
Randy Allen Scott, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 90 days.

This patent is subject to a terminal disclaimer.

(21) Appl. No.: 12/484,536

(22) Filed: Jun. 15, 2009

(65) Prior Publication Data
US 2009/0254648 A1 Oct. 8, 2009

Related U.S. Application Data

(63) Continuation of application No. 10/977,647, filed on Oct. 29, 2004, now Pat. No. 7,571,224.

(51) Int. Cl.
*G06F 15/173* (2006.01)
*G06F 15/16* (2006.01)

(52) U.S. Cl. ........ 709/223; 709/204; 709/205; 709/206; 709/207

(58) Field of Classification Search .......... 709/204–207, 709/223
See application file for complete search history.

(56) References Cited

U.S. PATENT DOCUMENTS

| | | | |
|---|---|---|---|
| 5,509,122 A * | 4/1996 | Bartow et al. | 709/227 |
| 6,049,798 A | 4/2000 | Bishop et al. | |
| 6,501,834 B1 | 12/2002 | Milewski et al. | |
| 6,553,389 B1 | 4/2003 | Golding et al. | |
| 6,574,663 B1 | 6/2003 | Bakshi et al. | |
| 6,578,054 B1 | 6/2003 | Hopmann et al. | |
| 6,631,247 B1 * | 10/2003 | Motoyama et al. | 399/8 |
| 6,640,230 B1 | 10/2003 | Doss et al. | |

(Continued)

FOREIGN PATENT DOCUMENTS

WO 0143470 A1 6/2001

OTHER PUBLICATIONS

IBM Technical Disclosure Bulletin, "Machine-Under-Test Initialization", vol. 34, No. 10B, Mar. 1992, pp. 91-94.

*Primary Examiner* — George C Neurauter
(74) *Attorney, Agent, or Firm* — Yee & Associates, P.C.; Jeffrey S. LaBaw

(57) ABSTRACT

Method, system and computer program product for communicating information regarding a managed resource in a network data processing system. A method, in a network data processing system, for communicating information regarding a managed resource includes receiving management information regarding at least one managed resource. The received management information is converted into a specified format, and the converted management information is then sent to at least one management application in conjunction with the sending of presence information to the at least one management application. The converted management information may then be extracted from the presence information for use in any desired manner. The invention provides a convenient mechanism for communicating status information and other appropriate information regarding a managed resource to interested parties connected to the network data processing system.

18 Claims, 4 Drawing Sheets

U.S. PATENT DOCUMENTS

| | | |
|---|---|---|
| 6,640,241 B1 | 10/2003 | Ozzie et al. |
| 6,668,173 B2 | 12/2003 | Greene |
| 6,678,719 B1 | 1/2004 | Stimmel |
| 6,728,761 B2 | 4/2004 | Decime |
| 6,886,050 B2 * | 4/2005 | Takamizawa et al. ............ 710/8 |
| 7,236,472 B2 * | 6/2007 | Lazaridis et al. ............ 370/328 |
| 7,337,353 B2 * | 2/2008 | Yamamoto et al. ............... 714/7 |
| 7,363,355 B2 * | 4/2008 | Knauerhase et al. ......... 709/219 |
| 2002/0184089 A1 | 12/2002 | Tsou et al. |
| 2002/0198946 A1 | 12/2002 | Wang et al. |
| 2003/0003938 A1 | 1/2003 | O'Neill et al. |
| 2003/0023691 A1 | 1/2003 | Knauerhase |
| 2003/0037103 A1 | 2/2003 | Salmi et al. |
| 2003/0218631 A1 | 11/2003 | Malik |
| 2008/0046510 A1 * | 2/2008 | Beauchamp et al. ......... 709/204 |
| 2008/0140794 A1 * | 6/2008 | Rybak .......................... 709/207 |

* cited by examiner

USING PRESENCE IN A SYSTEM MANAGEMENT ENVIRONMENT

This application is a continuation of application Ser. No. 10/977,647 filed Oct. 29, 2004, which issued on Aug. 4, 2009 as U.S. Pat. No. 7,571,224.

BACKGROUND OF THE INVENTION

1. Technical Field

The present invention relates generally to the data processing field and, more particularly, to a system, method and computer program product for communicating resource information over a network data processing system using presence.

2. Description of Related Art

Instant messaging (IM) is an online chat medium that allows users to communicate with one another in real-time over a network data processing system. Instant messaging is commonly used over the Internet, and is analogous to a telephone conversation between two individuals but uses text-based communication rather than voice-based communication. In an instant messaging system, a communication session between two users is initiated by one user selecting a person with whom he desires to communicate. The user then types a message in a dialog box in a window and presses "send". The sent message appears instantly on the selected person's computer. During a communication session each party can create and send desired messages to the other party.

In addition to enabling users to communicate in real time during a communication session, an instant messaging system also includes a capability of monitoring and reporting the status of users that have established each other as online contacts. This monitoring and reporting capability is referred to as "presence" and enables one user to detect whether other users are online. Typically, presence alerts a user whenever a particular individual on the user's private list, often referred to as a "Buddy List", is online. The user can then initiate a communication session with that particular individual.

In addition to reporting whether a particular individual is online, current presence systems also include a capability of transmitting limited information regarding the availability of an individual that is online to participate in a communication session. In particular, an individual may create an "away message" to be communicated as presence information. The away message may include, for example, limited information indicating the reason an individual is not presently available for a communication session, or information as to when the individual is expected to be available for a communication session.

Basically, a presence system includes software that sends a heartbeat signal via a presence network to determine if particular individuals are online. Presence information is sent to a user over the presence network via a presence packet.

It would be desirable to utilize the presence capability of an instant messaging system to communicate information concerning a managed resource over a network data processing system

SUMMARY OF THE INVENTION

The present invention provides a method, system and computer program product for communicating information regarding a managed resource over a network data processing system. A method, in a network data processing system, for communicating information regarding a managed resource includes receiving management information regarding at least one managed resource. The received management information is converted into a specified format, and the converted management information is then sent to at least one management application in conjunction with the sending of presence information to the at least one management application. The converted management information may then be extracted from the presence information for use in any desired manner. The invention provides a convenient mechanism for communicating status information and other appropriate information regarding a managed resource to interested parties connected to the network data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
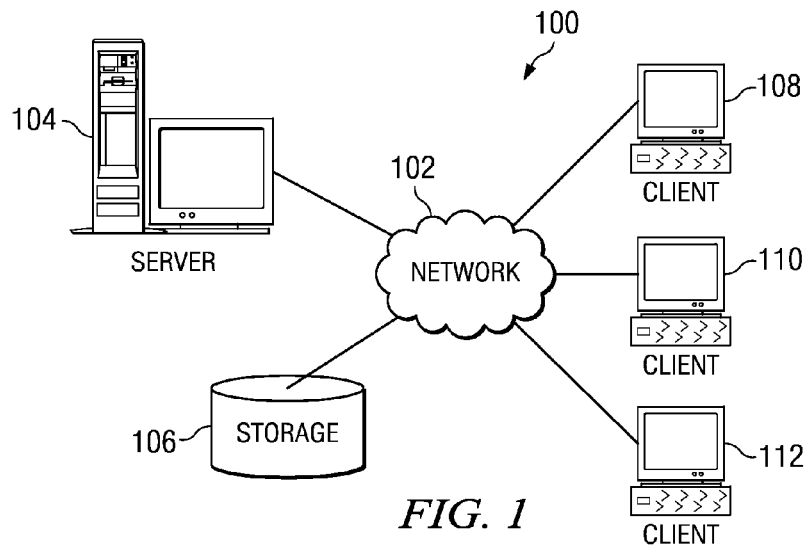
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
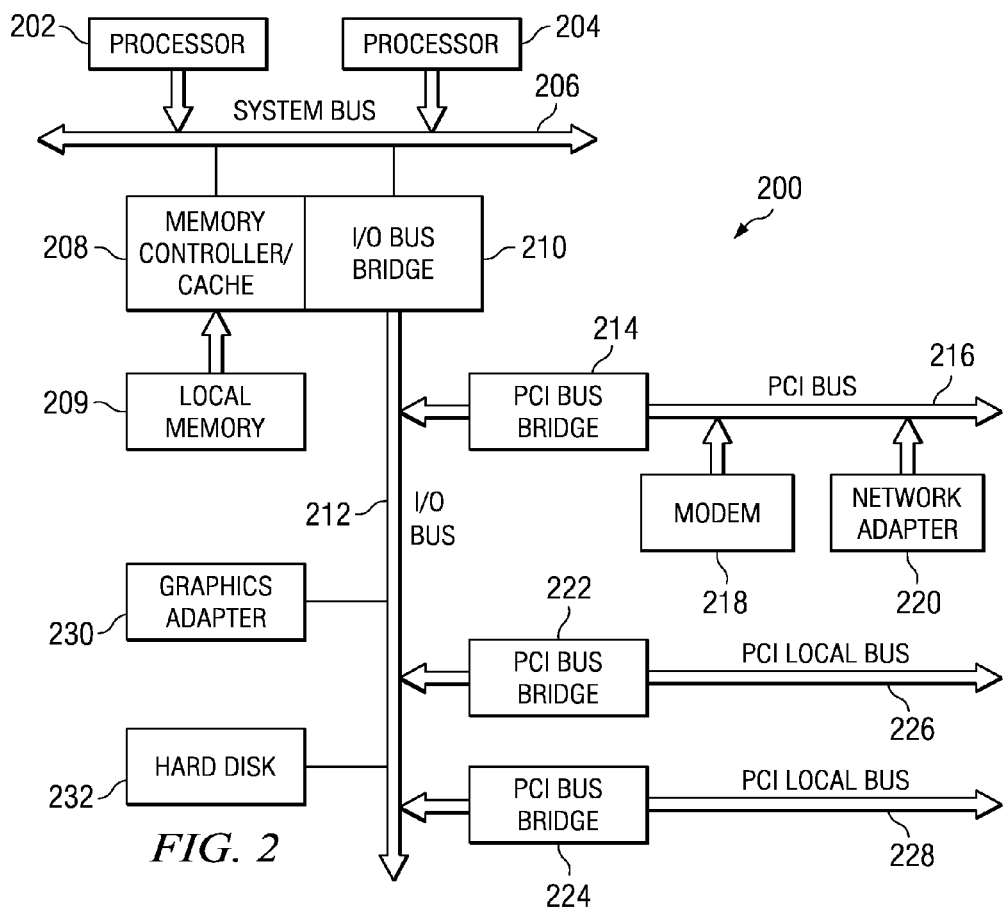
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
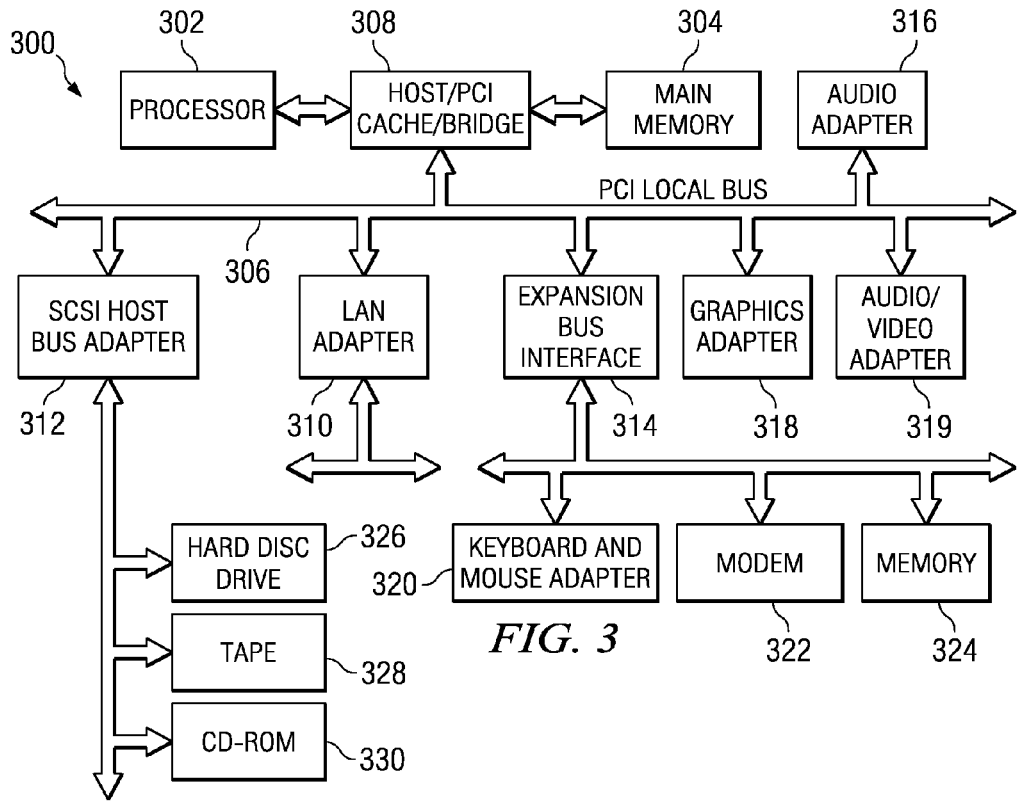
FIG. 3 is a block diagram of a data processing system that may be implemented as a client in accordance with a preferred embodiment of the present invention.

With reference now to FIG. 3, a block diagram of a data processing system that may be implemented as a client, such as one of clients 108, 110 and 112 in FIG. 1, is depicted in accordance with a preferred embodiment of the present invention. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
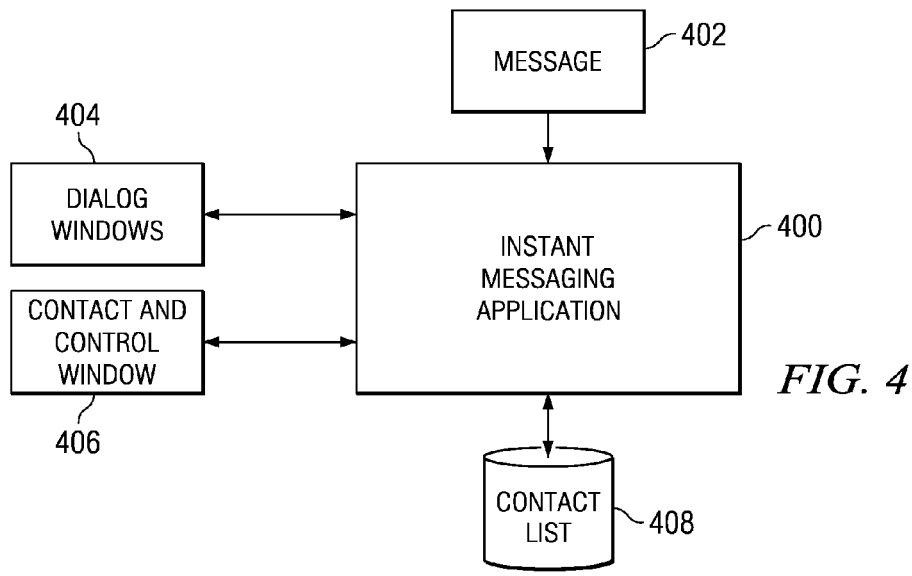
FIG. 4 is a diagram that illustrates components used in an instant messaging system in accordance with a preferred embodiment of the present invention.

FIG. 4 is a diagram that illustrates components used in an instant messaging system in accordance with a preferred embodiment of the present invention. The instant messaging system, which may be implemented in a network of data processing systems such as network data processing system 100 in FIG. 1, includes an instant messaging application 400 that processes messages, such as message 402 received from a user located on a remote data processing system, such as one of client data processing systems 108, 110 and 112 in FIG. 1. As messages are received, the messages are presented in dialog windows 404. Messages exchanged between instant messaging application 400 and an instant messaging application on a remote data processing system form a communication session.

Dialog windows 404 provide an interface for user input to send messages to other users. Contact and control window 406 is presented by instant messaging application 400 to provide the user with a list of user names, commonly referred to as a "Buddy List", as well as other information, such as, for example, identifying other users that are currently online. Contact and control window 406 may also provide an interface to allow a user to set preferences, for example, the color and font to be used in instant messaging application 400.

The list of user names presented by contact and control window 406 is stored in contact list 408. User names may be added to or deleted from contact list 408. Contact list 408 is employed in presenting the list of user names within contact and control window 406.

The user may additionally view the status of other users on contact and control window 406. This status may, for example, be "available" or "unavailable". When the status of another user is available, messages from instant messaging application 400 will be accepted by the application for that user to start a communication session. When the status of another user is unavailable, messages from instant messaging application 400 will not be accepted by the application for that user.

The capability of detecting whether other users are online and available is referred to as "presence". Presence services are typically provided through applications such as instant messaging, although it should be understood that the invention is not limited to instant messaging applications, but may be used in other areas that may utilize presence such as Voice over IP (VoIP) applications. Basically, presence is implemented by software that provides a heartbeat signal to determine if a user is online. Information indicating that a particular user is online is transmitted over a network data processing system by a presence information packet.

The presence information packet may also carry other presence information such as an "away message" created by a particular user to inform of reasons why the user is not presently available for a communication session, to inform of when the user expects to be available for a communication session and the like.

The present invention utilizes the presence capability of instant messaging and other communications systems to communicate information regarding the state of a managed resource in a network data processing system, or other information about the managed resource to interested parties connected to the network data processing system.

Figure 5:
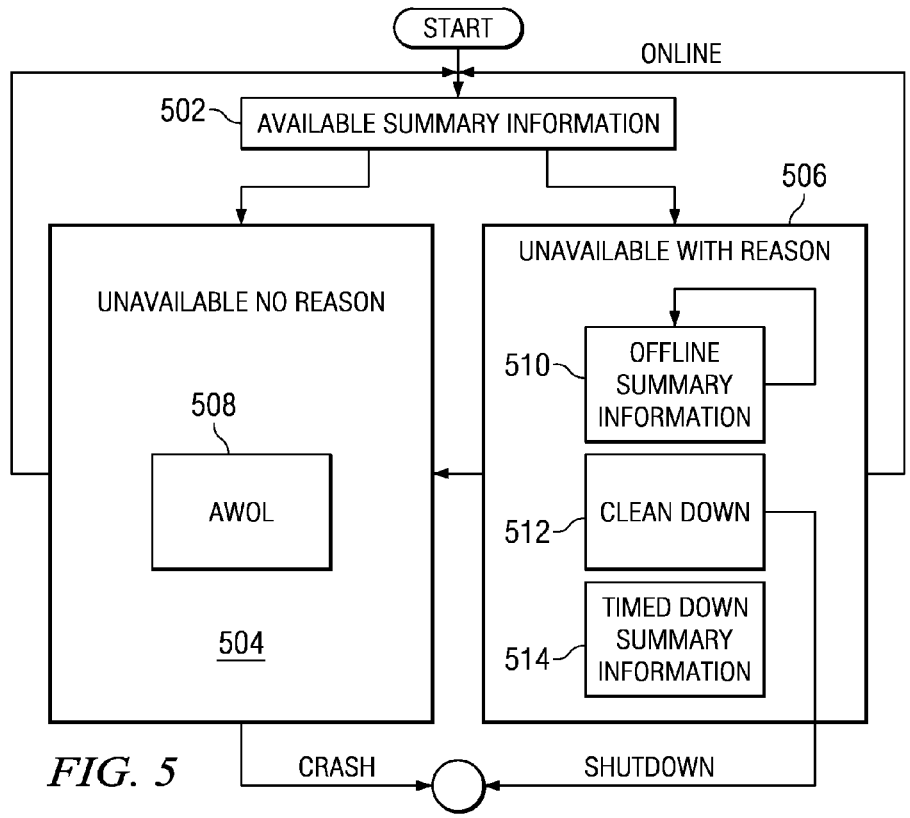
FIG. 5 is a state diagram that schematically illustrates the capability of using presence to communicate information regarding a managed resource during different states of the managed resource in accordance with a preferred embodiment of the present invention.

FIG. 5 is a state diagram that schematically illustrates the capability of using presence to communicate information regarding a managed resource during different states of the managed resource in accordance with a preferred embodiment of the present invention. The managed resource may be a component of a data processing system, for example, one of client computers 108, 110 and 112 in FIG. 1, or the managed resource may be a subcomponent of a component.

As illustrated in FIG. 5, a component may be in an available state as indicated at 502, an unavailable with no reason state as indicated at 504 or an unavailable with reason state as indicated at 506. In available state 502, the component is online and information regarding the component is capable of being communicated to an interested party via a presence network. In unavailable no reason state 504, which may be caused by a system crash, for example, neither information regarding the component nor information regarding a subcomponent of the component, indicated at 508, is capable of being communicated via the presence network. In unavailable with reason state 506, a subcomponent may, for example, be in an offline state as indicated at 510, a clean down state as indicated at 512 or a timed down state indicated at 514. In a clean down state, the communication of information regarding the subcomponent via the presence network is unavailable; however, in an offline state or a timed down state, information regarding the subcomponent may be communicated via the presence network.

Figure 6:
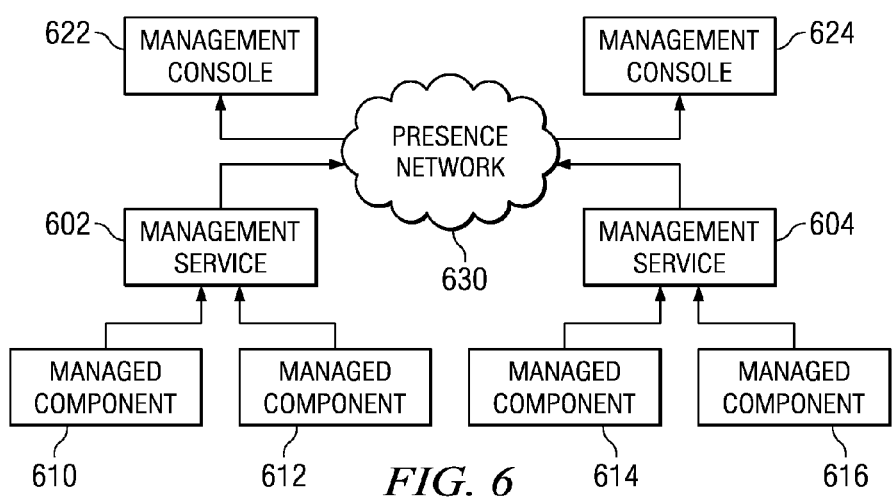
FIG. 6 is a diagram that illustrates managed resource information data flow in a network data processing system in accordance with a preferred embodiment of the present invention.

FIG. 6 is a diagram that illustrates managed resource information data flow in a network data processing system in accordance with a preferred embodiment of the present invention. The network data processing system is generally designated by reference number 600, and in the example depicted in FIG. 6, includes two management services 602 and 604. Management service 602 manages/monitors managed resources 610 and 612, and management service 604 manages/monitors managed resources 614 and 616. It should be understood, however, that the example depicted in FIG. 6 is intended to be exemplary only as network data processing system may include any desired number of management services, each managing/monitoring any desired number of managed resources.

Management services 602 and 604 receive management information from the respective resources that they manage. The management information may include information regarding the state of the managed resources along with summary information specific to the state of the managed resource. The summary information may also be other appropriate information regarding the managed resource. Examples of types of summary information regarding a managed resource include:

Summary performance information
   Throughput
      Network-Bytes/sec., bytes received/sec., Bytes sent/sec.
Load information
   Number of clients
   CPU usage
Capacity information
   Number clients able to support
   Amount of disk (total, used, available)

Management services 602 and 604 are responsible for communicating state and summary information of each component managed by the management service to one or more interested parties, represented by management consoles 622 and 624. As shown in FIG. 6, the state information is transmitted to the management consoles through presence network 630. In effect, the management information is communicated to management consoles 622 and 624 by being piggybacked onto presence packets containing presence information that are communicated to management consoles 622 and 624.

Figure 7:
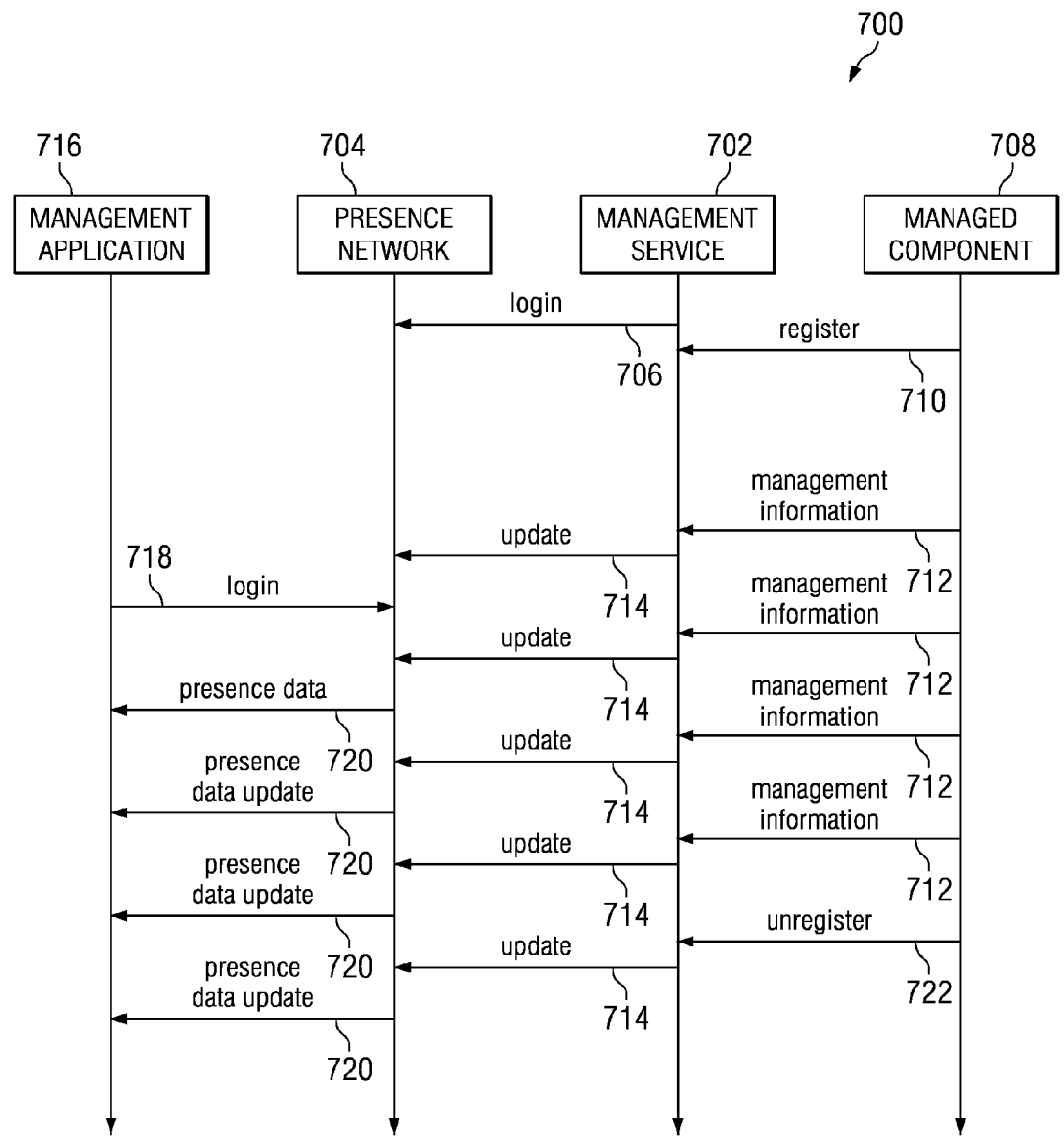
FIG. 7 is a timing chart that illustrates a method for using presence to communicate information regarding a managed resource over a network data processing system in accordance with a preferred embodiment of the present invention.

FIG. 7 is a timing chart that illustrates a method for using presence to communicate information regarding a managed resource over a network data processing system in accordance with a preferred embodiment of the present invention. The timing chart is generally designated by reference number 700, and the method begins by a management service 702 logging onto a presence network 704 as indicated at 706. A managed component 708 then registers with management service 702 as shown at 710, and thereafter communicates management information regarding the state of the managed component or other information regarding the managed component to management service 702 as indicated at 712. The management service can be implemented inside the managed component or via a proxy process. As shown in FIG. 7, management information may be transmitted a plurality of times, for example, at regular intervals or at specific times.

Each time management information is transmitted to management service 702 by managed component 708, the management service converts the received information into a summarized form in a specified format capable of being transmitted as presence information; and updates its presence information accordingly as shown at 714. The updates are then sent to one or more management applications 716 that have logged onto an instant messaging system, as shown at 718, via presence network 704 as indicated at 720. The one or more management applications extract the management information summaries from the presence updates and take any appropriate action based on the extracted information. As shown in FIG. 7, updated management information will continue to be transmitted to the one or more management applications until managed component 708 unregisters with management service 702 as shown at 722.

The present invention thus provides a method, system and computer program product for communicating information regarding a managed resource over a network data processing system. A method, in a network data processing system, for communicating information regarding a managed resource includes receiving management information regarding at least one managed resource. The received management information is converted into a specified format, and the converted management information is then sent to at least one management application in conjunction with the sending of presence information to the at least one management application. The converted management information may then be extracted from the presence information for use in any desired manner. The invention provides a convenient mechanism for communicating status information and other appropriate information regarding a managed resource to interested parties connected to the network data processing system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a network data processing system, for communicating management information regarding a managed resource comprising:
    receiving management information regarding at least one managed resource;
    converting the received management information into a specified format; and
    sending the converted management information to at least one management application in conjunction with sending of presence information regarding a user to the at least one management application, wherein converting the received management information into a specified format comprises summarizing the received management information into the specified format suitable for being sent to the at least one management application in conjunction with the sending of presence information to the at least one management application.

2. The method according to claim 1, wherein receiving management information regarding at least one managed resource comprises:
    receiving management information from at least one managed resource regarding the at least one managed resource.

3. The method according to claim 1, wherein the at least one management application is connected and logged on to an instant messaging system in the network data processing system.

4. The method according to claim 1, and further including:
    extracting the sent converted management information from the presence information; and
    taking an action based on the sent converted management information extracted from the presence information.

5. The method according to claim 1, wherein the management information comprises information regarding a state of the at least one managed resource.

6. The method according to claim 5, wherein the management information further includes summary information specific to the state of the at least one managed resource including throughput, load information and capacity information for the at least one managed resource.

7. The method according to claim 1, wherein the at least one managed resource comprises at least one managed component of the network data processing system.

8. The method according to claim 1, wherein the at least one managed resource comprises at least one managed subcomponent of a component of the network data processing system.

9. The method according to claim 1, and further including:
    periodically sending updated converted management information to the at least one management application in conjunction with the sending of presence information to the at least one management application.

10. A system for communicating management information regarding a managed resource over a network data processing system, comprising:
    at least one hardware managed resource; and
    a management service for receiving management information regarding the at least one managed resource, for converting the received management information into a specified format, and for sending over the network data processing system the converted management information to at least one management application in conjunction with sending of presence information regarding a user to the at least one management application, wherein the management service converts the received management information into the specified format by summarizing the received management information into the specified format suitable for being sent to the at least one management application in conjunction with the sending of presence information to the at least one management application.

11. The system according to claim 10, wherein the at least one managed resource sends the management information regarding the at least one managed resource to the management service.

12. The system according to claim 10, wherein the at least one management application is connected and logged on to an instant messaging system in the network data processing system.

13. The system according to claim 10, wherein the management information comprises information regarding a state of the at least one managed resource.

14. The system according to claim 13, wherein the management information further includes summary information specific to the state of the at least one managed resource including throughput, load information and capacity information for the at least one managed resource.

15. The system according to claim 10, wherein the at least one managed resource comprises at least one managed component of the network data processing system.

16. The system according to claim 10, wherein the at least one managed resource comprises at least one managed subcomponent of a component of the network data processing system.

17. A computer program product recorded in a computer readable recordable-type medium for communicating management information regarding a managed resource comprising:
    first instructions to receive management information regarding at least one managed resource;
    second instructions to convert the received management information into a specified format; and
    third instructions to send the converted management information to at least one management application in conjunction with sending of presence information regarding a user to the at least one management application, wherein the second instructions to convert the received management information into the specified format comprises instructions to summarize the received management information into the specified format suitable for being sent to the at least one management application in conjunction with the sending of presence information to the at least one management application.

18. The computer program product according to claim 17, and further including:
    fourth instructions to extract the sent converted management information from the presence information and take an action based on the sent converted management information extracted from the presence information.

* * * * *